United States Patent
Gorelik et al.

(10) Patent No.: US 8,363,897 B2
(45) Date of Patent: Jan. 29, 2013

(54) METHOD FOR DETECTION OF MOVING OBJECT OF APPROXIMATELY KNOWN SIZE IN CONDITIONS OF LOW SIGNAL-TO-NOISE RATIO

(76) Inventors: Victor Gorelik, Brooklyn, NY (US); Tatiana Gorelik, Brooklyn, NY (US)

( * ) Notice: Subject to any disclaimer, the term of this patent is extended or adjusted under 35 U.S.C. 154(b) by 189 days.

(21) Appl. No.: 13/048,834

(22) Filed: Mar. 15, 2011

(65) Prior Publication Data

US 2012/0237080 A1    Sep. 20, 2012

(51) Int. Cl.
    *G06K 9/00* (2006.01)
(52) U.S. Cl. .................................................. 382/103
(58) Field of Classification Search .......... 382/103, 382/295, 159, 272
    See application file for complete search history.

(56) References Cited

U.S. PATENT DOCUMENTS

2010/0201820 A1 * 8/2010 Lopota et al. ............. 348/152
2011/0142283 A1 * 6/2011 Huang et al. .............. 382/103

* cited by examiner

*Primary Examiner* — Bernard Krasnic
*Assistant Examiner* — Weiwen Yang

(57) ABSTRACT

The invention provides a method for detection of a moving object when signal-to-noise ratio is low. A field of view is presented as a regularly updated frame of data points. A state of the object is defined by an "azimuth-speed" pair (i.e., a hypothesis). On each update, a detection system performs two steps. At the first step, the brightness of data points of a new frame is replaced by the average brightness of points surrounding this point. At the second step, the brightness of data points of this frame is being accumulated separately for each hypothesis. On each update, one of hypotheses produces the accumulated frame with the brightest point. This hypothesis is considered the best; its frame is displayed on a screen. The object is detected when the best hypothesis stabilizes in a sequence of updates and the movement of the brightest point becomes consistent with this hypothesis.

1 Claim, 5 Drawing Sheets

FIG. 1A
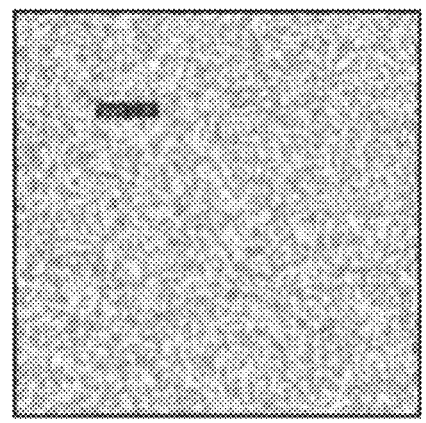
FIG. 1B
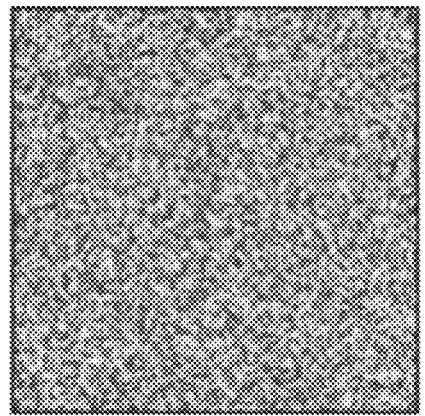
FIG. 1C
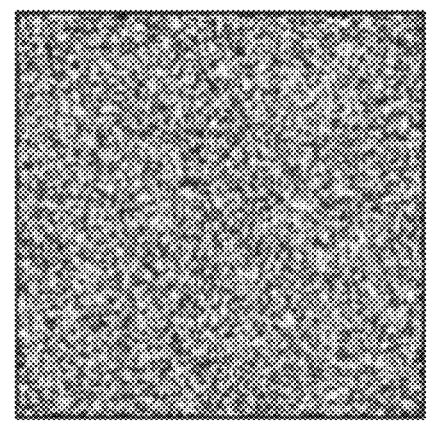
FIG. 1

FIG. 4A
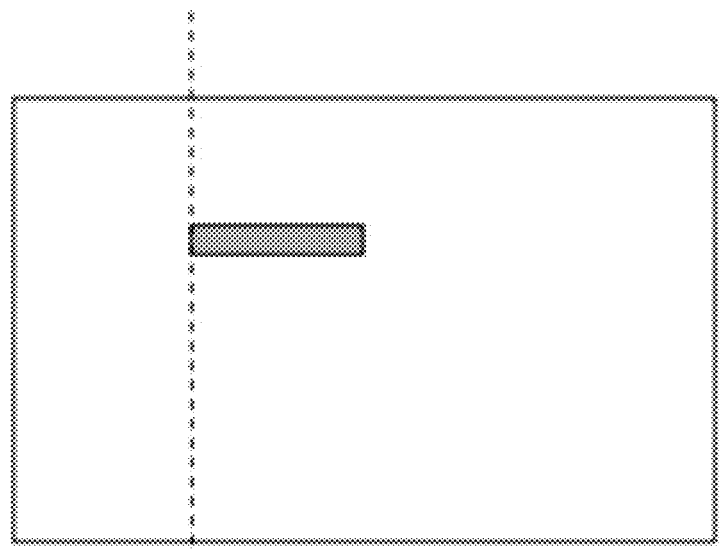
FIG. 4B
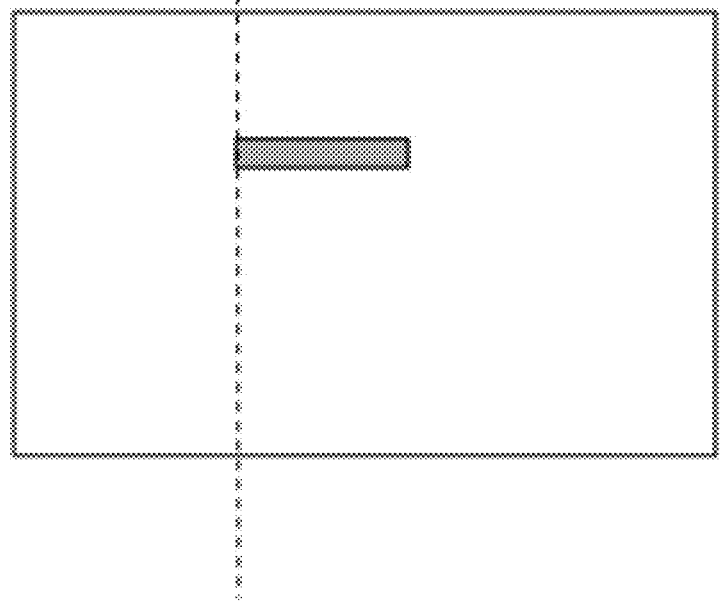
FIG. 4

METHOD FOR DETECTION OF MOVING OBJECT OF APPROXIMATELY KNOWN SIZE IN CONDITIONS OF LOW SIGNAL-TO-NOISE RATIO

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention relates generally to remote sensing and more particularly to methods for detecting objects of approximately known size in conditions of low signal-to-noise ratio.

Detection and tracking of a moving object is a problem of interest in surveillance systems. The major complications arise when signal-to-noise ratio is extremely low and the time for making a decision is limited.

The problem of surveillance is formulated as follows. At any moment, a field of view is presented as a frame of data points. An object in the field of view corresponds to a set of adjacent data points of the frame. The frame can be displayed on a screen as an image: one data point of the frame corresponds to one pixel of the image. Every T milliseconds, a detection system receives a new frame of the same field of view. The goal of detection is to identify if the object is in the field of view and to estimate the position and velocity of the object at the moment. The goal of tracking is to estimate the position and velocity of the object at each moment after the object has been detected.

Methods for solving problems of this type are described in, for example, Fatih M. Porikli et al., U.S. Patent Application 20100246997 or Matthew Orton and William Fitzgerald, IEEE TRANSACTIONS ON SIGNAL PROCESSING, VOL. 50, NO. 2, FEBRUARY 2002. Methods of using a-priori information for detection and tracking of moving objects are described, for example, by Franz Meyer et al. in CMRT05. IAPRS, Vol. XXXVI, Part 3/W24, 2005.

One of the most powerful approaches is Bayesian particle filtering. Each particle forms an independent hypothesis of the state of the object (its azimuth, speed, x-coordinate, and y-coordinate) at a given time. This method estimates a sequence of actual states of the object based on a sequence of observed states.

The programming implementation of the Bayesian method is capable of dealing with 10,000 particles in 55 frames per second. Computations are parallelized in Compute Unified Device Architecture (CUDA); see Matthew A. Goodrum et al., $3^{rd}$ Workshop on EAMA in conjunction with ISCA 2010.

From an implementation point of view, this method has a bottleneck: about 90% of the time the program spends on update of particles' weights. Particles weighs are being updated because the number of specified hypotheses is very big (it is equal to the product of four numbers: the number of all possible azimuths, speeds, x-coordinates, and y-coordinates of the object), so it is computationally infeasible to follow all of them.

From a conceptual point of view, this method as well as other known methods have a room for improvement because they do not use the fact that the object is a compact set of adjacent data points of the frame.

SUMMARY OF THE INVENTION

It is therefore an objective of the present invention to provide a method utilizing the fact that the object is a compact set of adjacent data points of the frame. The method is designed for smoothing the brightness of data points of the frame. It is based on a-priori information about the approximate size and shape of the object and consists in replacing the brightness of each data point of the frame by the average brightness of points surrounding this point and representing a hypothetical object. The result of that is the smoothed frame that can be displayed as an image with increased signal-to-noise ratio.

It is another objective of this invention to provide a new method for accumulating the brightness of data points of the smoothed frame separately for each hypothesis. The accumulation is performed on each update of the frame in accordance with the transfer of the object between updates. This method dramatically reduces the number of hypotheses needed to process. In accordance with the invention, the number of hypotheses needed to process in order to detect the object is equal to the product of only two numbers: the number of all possible azimuths and the number of all possible speeds of the object. That makes it computationally achievable to follow all specified hypotheses. The proposed method is designed so that it automatically produces the values of x- and y-coordinates of the center of the object. All specified hypotheses can be processed in parallel.

The present invention is a method comprising both the smoothing and accumulating methods. The method is intended for detection of a single moving object of approximately known size in conditions of low signal-to-noise ratio. Compared to known methods, this method significantly decreases both the signal-to-noise threshold of detection and the time needed for detection.

BRIEF DESCRIPTION OF THE DRAWINGS

FIG. 1 illustrates three exemplary images of an object in the same field of view with different values of signal-to-noise ratio: in FIG. 1A the ratio is 3, in FIG. 1B—0.3, and in FIG. 1C—0.03.

FIG. 4 illustrates the method for accumulating the brightness of data points of a smoothed frame separately for each hypothesis. The accumulation is performed on each update of the frame in accordance with the transfer of the object between updates.

DETAILED DESCRIPTION OF SPECIFIC EMBODIMENTS

FIG. 1 is an exemplary image of an object in a field of view. The object has the shape of a rectangle 50 pixels×20 pixels.

All data points (pixels) of the object are supposed to have the same brightness, which is considered as a signal. Besides the signal, there is a random brightness in each point of the image. The standard deviation of this random brightness is noise.

FIG. 1A is an image of the field of view with a signal-to-noise ratio of 3.

FIG. 1B is an image of the same field of view with the same object in the same position with a signal-to-noise ratio of 0.3. The object is virtually not visible at this level of noise.

FIG. 1C is an image of the same field of view with the same object in the same position with a signal-to-noise ratio of 0.03. The object is not visible at all. The test results of the invention have been calculated for this level of noise.

Figure 2:
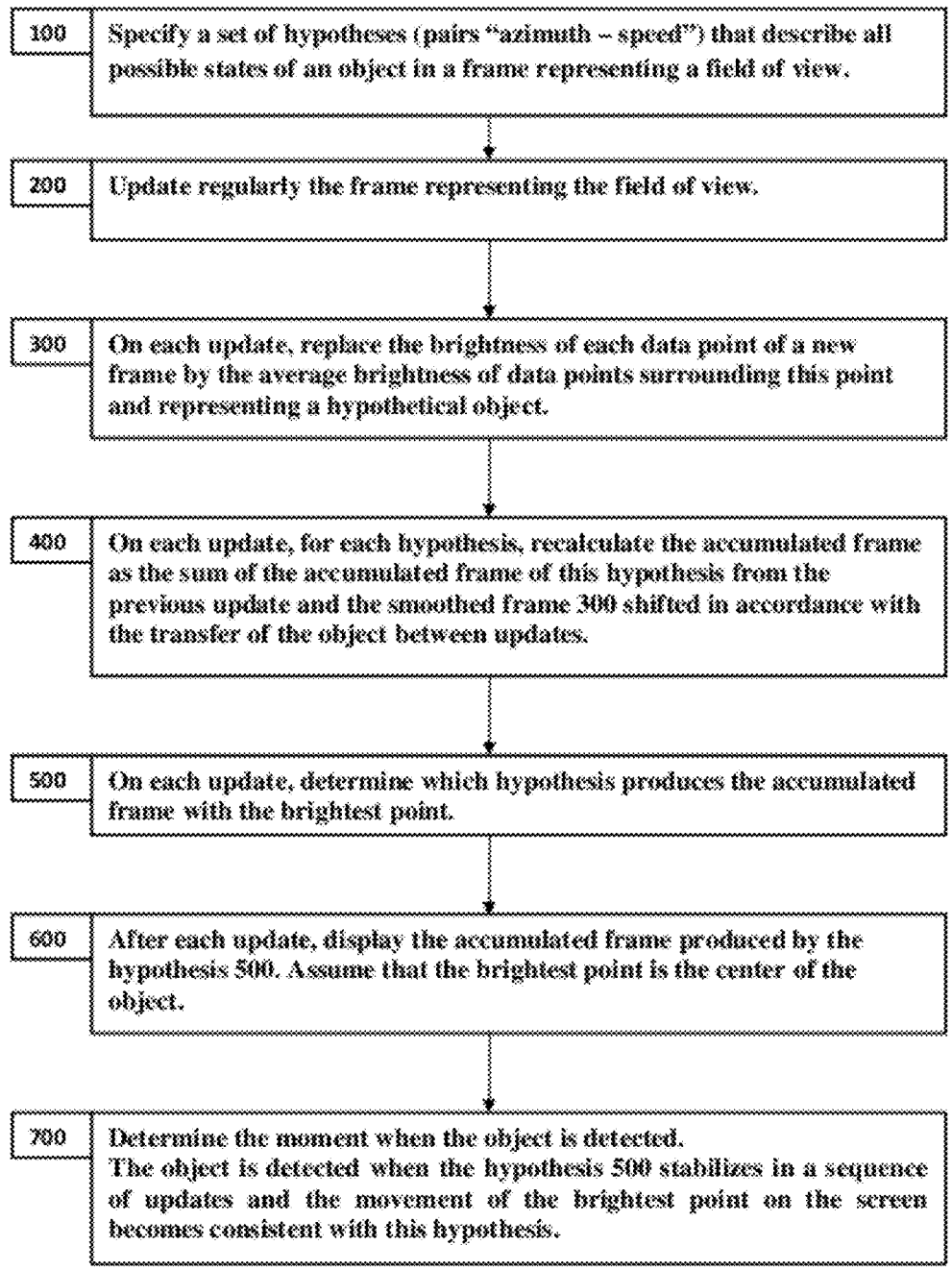
FIG. 2 illustrates a flowchart of an exemplary detection system.

FIG. 2 illustrates a flowchart of an exemplary detection system in accordance with the invention. Step 100: specifying a set of hypotheses (pairs "azimuth-speed") that describe all possible states of an object in a frame representing a field of view. Step 200: updating the frame regularly. Step 300: on each update, smoothing the brightness of data points of a new frame. Step 400: on each update, recalculating the accumulated frame of each specified hypothesis. Accumulated frames are used for accumulating the brightness of data points of the smoothed frame separately for each hypothesis. The processes of this step can be implemented in parallel. Step 500: on each update, determining a hypothesis that represents the actual state of the object the best, i.e., finding the best hypothesis. Step 600: after each update, displaying the accumulated frame of the best hypothesis. Step 700: determining the moment when the object is detected.

The update 200 implies that the detection system receives a new frame of the same field of view every T milliseconds.

Figure 3:
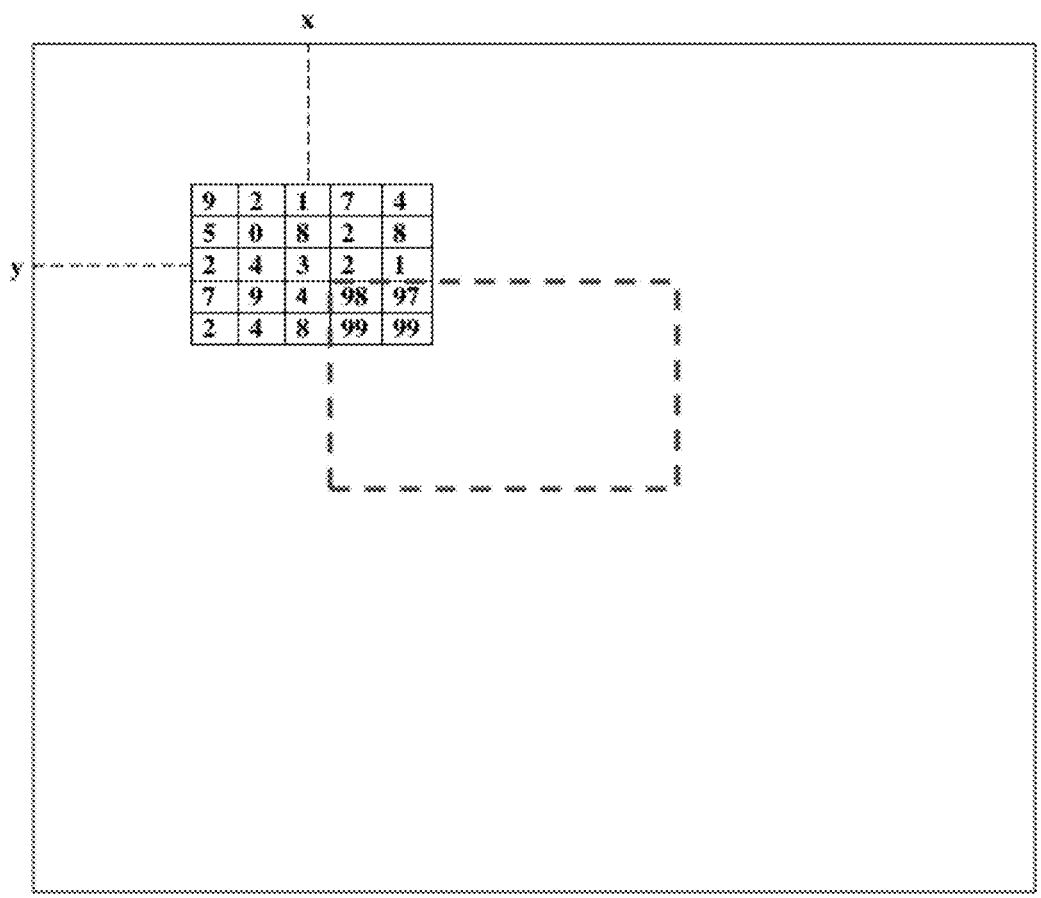
FIG. 3 illustrates the method for smoothing the brightness of data points of a frame.

FIG. 3 illustrates the method for smoothing the brightness of data points of each new frame in accordance with the invention. The rectangle 7×6 with dashed sides represents the actual shape, size, and position of the object in the frame. At the start of the detection, this position is unknown and has to be determined. The a-priori information regarding the shape and size of the object is that it is a square 5×5.

In accordance with the invention, the smoothing 300 is implemented as follows.

The point (x, y) in FIG. 3 is the center of a hypothetical object, which is the square 5×5. Before smoothing, the brightness of the point is equal to 3. This value is being replaced by the value of s(x, y)=(9+2+1+7+...+99+99)/25=19.48, which is the average brightness of all data points of the square. To increase the speed of smoothing, it makes sense to use the following formula $$s(x,y)=[F(x+2,y+2)-F(x+2,y-2)+F(x-2,y+2)+F(x-2,y-2)]/25,$$

where F(m, n) is the sum of the brightness of all points with coordinates (v, u), where $0<=v<=m$ and $0<=u<=n$.

This type of calculations is being performed for each data point of the frame. The result of that is the smoothed frame.

The idea behind the smoothing is to increase the signal-to-noise ratio of any image of the object. In case of a 5×5 square the gain in the ratio is equal to 5.

Side effects of the smoothing method are an incorrect representation of the size of the object and an incorrect value of the brightness of data points of the object in the frame.

For example, if noise is equal to zero and a hypothetical square 5×5 does not overlap the actual object in the frame, then the smoothed brightness of the center (x, y) of this square is also equal to zero. If the center of the square coincides with the center of the actual object, then the smoothed brightness of the center of this square has the maximum value. If the square partially overlaps the actual object, then the smoothed brightness of the center of the square is not equal to zero.

As the result of the smoothing, the actual object having the shape of a rectangle and the same brightness of each data point is represented by a larger rectangle having the maximum brightness in the center and zero brightness on the sides.

It is essential that the centers of the actual object and its smoothed representation coincide. For some purposes, it is enough to know the center of the object. For example, if the object is a target, then the detection of its center is what is needed.

In accordance with the invention, the step 400 is recalculating the accumulated frame of each hypothesis. On each update 200, each hypothesis produces one accumulated frame, so the number of accumulated frames is equal to the number of hypotheses. For example, if there are 360 specified azimuths and 100 specified speeds, then the number of accumulated frames is 36,000, the same as the number of specified hypotheses. At the start of the detection, when the very first frame representing the field of view is received and smoothed, the detection system creates 36,000 accumulated frames. They all are identical and equal to this first smoothed frame. When the next frame is received and smoothed, it is being used to recalculate the accumulated frame of each hypothesis as the sum of the previously accumulated frame of each hypothesis and this smoothed frame shifted in accordance with the transfer of the object during the update.

FIG. 4 illustrates an example of the algorithm for calculating the accumulated frame of such a hypothesis that the object is moving from left to right (i.e., its azimuth is 90°) and that during the time interval between two sequential updates, the object moves at a distance equal to D—the distance between two adjacent data points (the size of a pixel) of the frame. In particular, FIG. 4 illustrates two sequential frames: FIG. 4A shows the very first received and smoothed frame; FIG. 4B shows the second received and smoothed frame.

In accordance with the invention, as soon as the first frame is smoothed, the detection system generates the initial accumulated frames (equal to the first smoothed frame) for each specified hypothesis including the exemplary one. After the second frame is smoothed, it is being shifted relative to the previously accumulated frame of the hypothesis by the distance D so that the objects in both frames would be positioned along the same vertical. After that, the system recalculates the brightness of data points of the accumulated frame of the hypothesis using all data points of both frames as follows.

If the brightness of data points in some row of the frame in FIG. 4A is $a0,a1,a2,a3,a4,a5 \ldots, a253,a254,a255$ and the brightness of data points in the same row of the frame in FIG. 4B is $b0,b1,b2,b3,b4,b5 \ldots, b253,b254,b255,$ then the brightness of data points in the same row of the accumulated frame after the update is $b0,b1+a0,b2+a1,b3+a2 \ldots, b254+a253,b255+a254$ The FIG. 4 also is used for the illustration of the algorithm for recalculating the accumulated frame of the same hypothesis after the third frame is received and smoothed.

At this time, FIG. 4A represents the accumulated frame obtained as the result of the preceding update, and FIG. 4B represents the third received and smoothed frame. The frame in FIG. 4B is being shifted relative to the frame in FIG. 4A by the distance D so that the objects in both frames would be positioned along the same vertical. After that, the system recalculates the brightness of data points of the accumulated frame, using all data points of both frames as follows.

If the brightness of data points in some row of the frame in FIG. 4A is $$A0, A1, A2, A3, A4, A5 \ldots, A253, A254, A255$$

and the brightness of data points in the same row of the frame in FIG. 4B is $$B0, B1, B2, B3, B4, B5 \ldots, B253, B254, B255,$$

then the brightness of data points in the same row of the accumulated frame after the update is $$B0, B1+A0, B2+A1, B3+A2 \ldots, B254+A253, B255+A254$$

The general formula for recalculating the brightness of data points of the accumulated frame of the hypothesis after a new frame is received and smoothed is as follows.

$$B0, B1+w*A0, B2+w*A1 \ldots, B254+w*A253, B255+w*A254,$$

where the coefficient w depends on an assumption regarding the speed of the object. If the assumption is that the speed of the object stays constant while the object moves in the field of view, then w=1. If the assumption is that the speed of the object is not constant, then w<1 and its value depends on the acceleration of the object. The testing results have been obtained in the present invention for w=1.

For other hypotheses, where the object has some other speed (not equal to D per T milliseconds) or some other azimuth (not 90°), data points of smoothed frames may not coincide with data points of accumulated frames. In these cases, two-dimensional linear interpolation is used to recalculate the brightness of data points of accumulated frames after each update:

$$I(x-d, y-h) = \{[I(x-1, y-1)*d + I(x, y-1)*(D-d)]*h + [I(x-1, y)*d + I(x, y)*(D-d)]*(D-h)\}/(D*D),$$

where d is a horizontal shift of the object during the time T, h is a vertical shift of the object during the time T, and I(x−d, y−h) is the brightness of the point (x−d, y−h) of an accumulated frame.

These calculations are being performed for each data point (x, y) of a new smoothed frame as follows: the smoothed brightness of the point (x, y) is being added to the interpolated brightness of the point (x−d, y−h) of the accumulated frame from the preceding update. The result of that is the recalculated accumulated frame of one particular hypothesis.

Only one of all specified hypotheses—the correct hypothesis—corresponds to the actual movement of the object.

The formulas above suggest an accumulation effect of the brightness only for data points of the accumulated frame of the correct hypothesis. It is so because only in this case the position of the object in the accumulated frame from the preceding update coincides with the position of the object in a new smoothed frame in each update. In case of any other hypotheses, the positions of the objects in the accumulated frame from the preceding update and in a new smoothed frame do not coincide during updates, so there is no actual accumulation.

The accumulated brightness of the data points of the object is proportional to the number of updates. The accumulated brightness of the other points of the accumulated frame of the correct hypothesis is proportional to the square root of the number of updates. It means that when the number of updates is big enough, the object becomes visible on a screen.

The described process of accumulating data for all hypothesis can be performed in parallel, i.e., one logical core is used for one hypothesis.

In accordance with the invention, the step 500 is determining a hypothesis that represents the actual state of the object the best. On each update 200, all specified hypothesis (all pairs "azimuth-speed") produce 36,000 accumulated frames. One point of each accumulated frame is the brightest. The brightest point among the brightest points of all accumulated frames defines the best frame and the best hypothesis. During an update, the best hypothesis may coincide or not coincide with the correct hypothesis.

In accordance with the invention, in the step 600, after each update, the best accumulated frame is sent to a display screen. The brightest point is considered as the center of the object.

In accordance with the invention, in the step 700, the system determines the moment when the object is detected. It is completed as follows.

While the number of updates is small, the best hypothesis (the best pair "azimuth-speed") in an update can be very different from the best hypotheses in the preceding update, so the position of the brightest point in the screen may jump in random directions from one point of the frame to another. However, when the number of updates is big enough, the inconsistency in recognition of the best hypothesis significantly decreases because of accumulation of the signal from the object so that the best hypothesis becomes practically constant and close to the correct hypothesis. As a result, the movement of the brightest point on the screen becomes consistent with the best azimuth and speed.

The explanation of the expression "consistent with the best azimuth and speed" is as follows. The position of the brightest point after an update can be predicted using the current values of the best azimuth and speed and the current position of the brightest point at the moment. If the predicted position coincides (plus/minus 1 pixel) with the real position of the brightness point after the update and if it holds through the next 10 consecutive updates, then the motion of the brightest point is considered consistent with the best azimuth and speed. At that moment, the object is considered detected.

Figure 5:
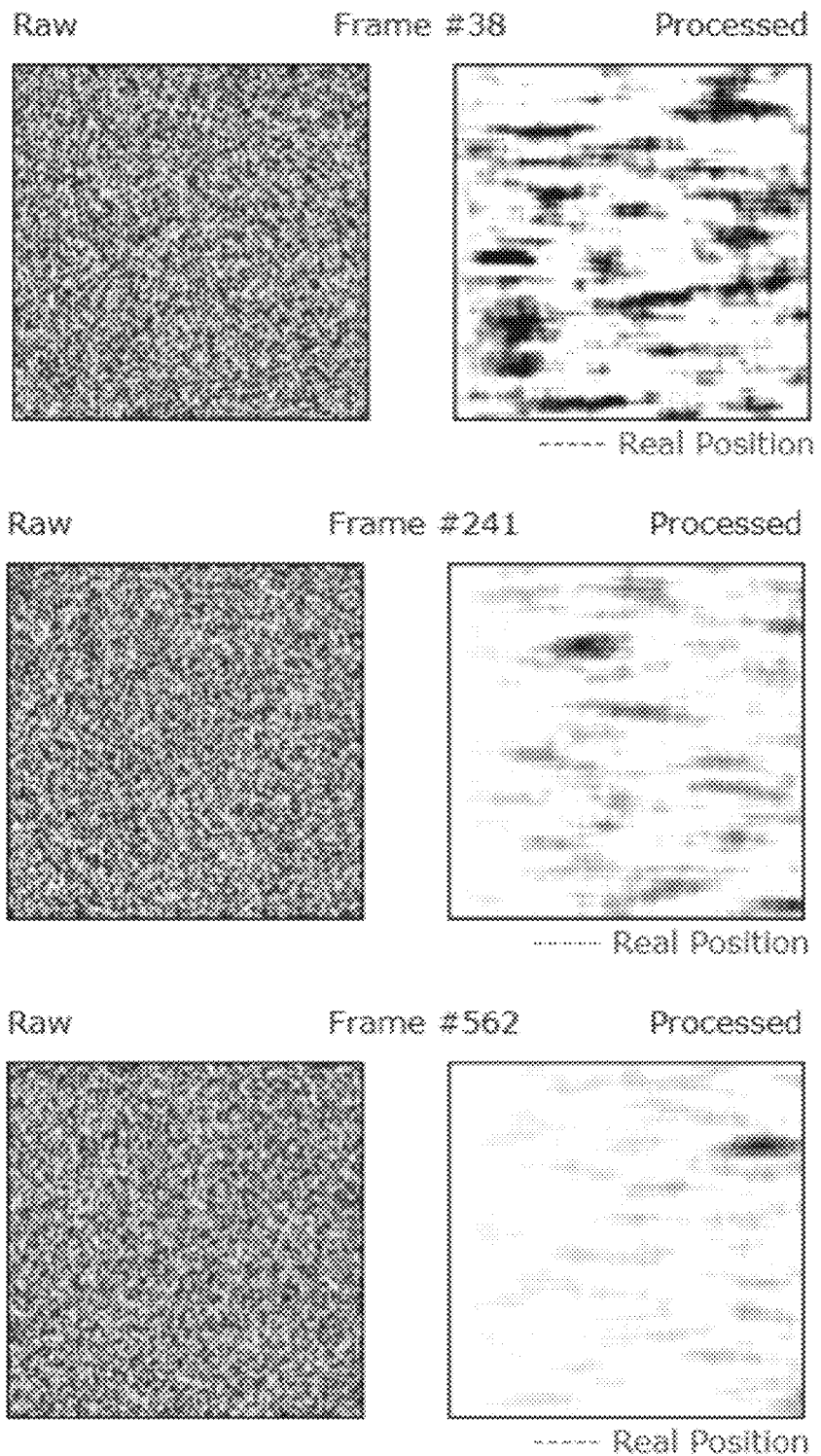
FIG. 5 illustrates raw and processed images of an object in the same field of view at three stages of detection: the object is not detected (frame update #38), the object is detected (frame update #241), and the object is tracked (frame update #562).

FIG. 5 depicts three stages of detection of an object: a) the object is not detected yet (frame update #38); b) the object is detected (frame update #241); c) the object is tracked (frame update #562). On each stage, there are two frames: the left one is a new frame received on the specified update; the right frame is the accumulated frame of the best hypothesis in this update. The FIG. 5 illustrates efficiency of the method of the present invention in reducing both the signal-to-noise threshold and the time of the object detection.

The main difference between the method of the present invention and the known Bayesian method is in the number of hypotheses to process in order to detect a moving object. In Bayesian method, a state of the object is defined by four parameters: azimuth, speed, and x and y coordinates of the center of the object. Bayesian method searches the actual state of the object in a four-dimensional space. The proposed methods of the present invention make it possible to detect a moving object by scanning just a two-dimensional subspace defined by the parameters: azimuth and speed. It dramatically reduces the number of hypotheses to process, which is one of the reasons of high computational performance of the method of the invention Although the present invention has been described in terms of the preferred embodiments, it is to be understood that the disclosure is not to be interpreted as limiting. Various modifications will become apparent to those skilled in the art after having read this disclosure. For example, although the above embodiments have been described in the assumption that an object has a constant speed and a constant azimuth during the time of detection, the proposed method can be employed for more general cases using weighting coefficients for smoothed and accumulated frames. Accordingly, it is intended that the appended claims be interpreted as covering all alterations and modifications within the spirit and scope of the invention.

The invention claimed is:

1. A method for detection of a moving object of approximately known size in conditions of low signal-to-noise ratio comprising:

specifying a set of hypotheses (pairs: "azimuth-speed") that describe all possible states of the object in a frame of data points representing a field of view;

updating regularly the frame representing the field of view;

smoothing, on each update, a brightness of data points of a new frame by replacing the brightness of each data point with an average brightness of data points surrounding this point and representing a hypothetical object;

recalculating, on each update, an accumulated frame of each specified hypothesis as a sum of the accumulated frame of this hypothesis from a preceding update and the new smoothed frame shifted in accordance with a transfer of the object between updates;

determining, on each update, a hypothesis that represents an actual state of the object the best as a hypothesis that produces the accumulated frame with a brightest point;

displaying the accumulated frame of the best hypothesis after each update;

determining a moment when the object is detected as the moment when the best hypothesis stabilizes in a sequence of updates and a movement of the brightest point in a screen becomes consistent with the azimuth and speed of this hypothesis;

reporting coordinates of the object, its azimuth and speed to a surveillance system.

* * * * *